(12) United States Patent
Yin

(10) Patent No.: US 11,330,802 B1
(45) Date of Patent: May 17, 2022

(54) LOCK CATCH FOR PET TRACTION

(71) Applicant: ZHONGSHAN GREAT-PET INTERNATIONAL CO., LTD., Zhongshan (CN)

(72) Inventor: Lin Yin, Zhongshan (CN)

(73) Assignee: ZHONGSHAN GREAT-PET INTERNATIONAL CO., LTD., Zhongshan (CN)

( * ) Notice: Subject to any disclaimer, the term of this patent is extended or adjusted under 35 U.S.C. 154(b) by 0 days.

(21) Appl. No.: 17/342,488

(22) Filed: Jun. 8, 2021

(51) Int. Cl.
  *A01K 27/00* (2006.01)
  *F16B 45/02* (2006.01)
  *F16B 45/06* (2006.01)

(52) U.S. Cl.
  CPC .......... *A01K 27/005* (2013.01); *F16B 45/023* (2021.05); *F16B 45/06* (2013.01)

(58) Field of Classification Search
  CPC ...... A01K 27/005; F16B 45/023; F16B 45/06
  See application file for complete search history.

(56) References Cited

U.S. PATENT DOCUMENTS

| | | | | |
|---|---|---|---|---|
| 2,234,853 | A * | 3/1941 | Brueggeman | F16B 45/06 24/375 |
| 5,769,475 | A * | 6/1998 | Tylaska | F16G 15/04 24/601.5 |
| 6,457,896 | B1 * | 10/2002 | deDoes | A01K 27/005 403/164 |
| 6,945,676 | B1 * | 9/2005 | Scott | F16B 45/02 362/396 |
| 9,284,181 | B1 * | 3/2016 | Nieslanik | A01K 27/005 |
| 10,731,698 | B2 * | 8/2020 | Chmelar | F16B 45/00 |
| 2002/0162201 | A1 * | 11/2002 | Liu | F16B 45/021 24/598.5 |
| 2014/0373320 | A1 * | 12/2014 | Nemec | F16B 45/02 24/599.6 |
| 2015/0335104 | A1 * | 11/2015 | Dickie | A44B 13/02 24/500 |
| 2016/0003274 | A1 * | 1/2016 | Garlick | F16B 7/0413 403/325 |
| 2017/0135319 | A1 * | 5/2017 | Onthank | A01K 27/005 |
| 2017/0241470 | A1 * | 8/2017 | Vaccari | F16B 45/02 |
| 2017/0268565 | A1 * | 9/2017 | Onthank | A62B 35/00 |
| 2018/0027776 | A1 * | 2/2018 | Chen | A01K 27/005 |
| 2018/0177157 | A1 * | 6/2018 | Butler, III | A01K 27/005 |
| 2018/0187713 | A1 * | 7/2018 | Chmelar | B60P 7/0823 |
| 2018/0374395 | A1 * | 12/2018 | Johnston | A01K 27/003 |
| 2020/0008409 | A1 * | 1/2020 | Al Maslamani | F16L 1/24 |
| 2020/0187458 | A1 * | 6/2020 | Onthank | F16B 45/02 |

* cited by examiner

*Primary Examiner* — David M Upchurch

(57) ABSTRACT

The present invention discloses a lock catch for pet traction, which comprises a traction hook and a pull ring connected with one end of the traction hook. The traction hook comprises a hook body, an even number of swinging resetting mechanisms and cylindrical pins. The hook body comprises a first connecting part and two installing parts; every two swinging resetting mechanisms form a group and are symmetrically penetrated in corresponding through holes; each swinging resetting mechanism comprises a swinging arm and a torsion spring; one end of each group of swinging arms positioned on the outer side of the installing part is positioned at a lower stopping point, and the other end can be mutually abutted against each other; and open ends limited by the two installing parts and the first connecting part are closed. The present invention has novel appearance, flexible and convenient use and difficult unhooking.

8 Claims, 3 Drawing Sheets

LOCK CATCH FOR PET TRACTION

TECHNICAL FIELD

The present invention relates to the technical field of lock catches, and particularly relates to a lock catch for pet traction.

BACKGROUND

In modern society, more and more people like to keep pets, and pet dogs have become the most popular pets at present. However, most of the pet dogs need to go out every day. In order to avoid unnecessary trouble, owners usually limit the motion of the pet dogs with a traction rope. Generally, the traction rope is connected with a collar worn on the pet dog by means of a lock catch. Therefore, the lock catch is important in addition to ensuring the quality of the traction rope and the collar.

The existing lock catch in the market mainly has the structure that: a hook opening is arranged on a hook-shaped buckle body; the lower end of a movable swinging arm is movably connected with the lower end of the hook opening; the upper end of the movable swinging arm is in contact with the upper end of the hook opening of the hook-shaped buckle opening; and a resetting tension spring is also arranged between the movable swinging arm and the hook-shaped buckle body, so that the movable swinging arm (the upper end) can quickly reset and close the hook opening after the hook opening is opened. However, after long-term use, the elasticity of the resetting tension spring is reduced and a resetting pulling force is too small. The hook opening is easy to be opened, causing unhooking. If a strong resetting tension spring is used, the resetting pulling force is too large and it is not convenient for the user to open the hook opening (i.e., open the movable swinging arm), thereby causing great use inconvenience for the user.

Therefore, the problem to be solved by those skilled in the art is how to provide a lock catch for pet traction with flexible and convenient use and difficult unhooking.

SUMMARY

A purpose of the present invention is to propose a lock catch for pet traction, which has novel appearance, flexible and convenient use and difficult unhooking.

The lock catch for pet traction according to the present invention comprises a traction hook and a pull ring connected with one end of the traction hook. The traction hook comprises a hook body, an even number of swinging resetting mechanisms and cylindrical pins.

The hook body comprises a first connecting part and two installing parts; the two installing parts are symmetrically and integrally connected to both ends of the first connecting part and form a U shape; the first connecting part is connected with the pull ring; the two installing parts are symmetrically provided with through holes along the relative arrangement directions of the two installing parts; every two swinging resetting mechanisms form a group and are symmetrically penetrated in corresponding through holes;

the cylindrical pins correspond to the number of the swinging resetting mechanisms, and are fixed and inserted on the installing parts;

each swinging resetting mechanism comprises a swinging arm and a torsion spring; the middle part of the swinging arm penetrates through the through hole and is rotatably connected with the cylindrical pin; the torsion spring is fixedly sleeved on the cylindrical pin; one end of the torsion spring is abutted against a hole wall of the through hole close to the top end of the installing part, and the other end is connected with the swinging arm; through the pretightening force of the torsion spring, one end of each group of swinging arms positioned on the outer side of the installing part is positioned at a lower stopping point, and the other end can be mutually abutted against each other; and open ends limited by the two installing parts and the first connecting part are closed.

It can be known from the above technical solution that compared with the prior art, the present invention discloses a lock catch for pet traction, wherein one end of the pull ring is connected with a pet traction rope; one end of a pull hook is buckled on a buckle ring of a pet collar; when one end of the swinging arm is positioned at the lower stopping point, the other ends of the two swinging arms are abutted and form a closed ring with the hook body; when the swinging arms rotate under stress, an opening is generated in the abutting position so that the lock catch can be buckled on a ring buckle of the pet collar; meanwhile, when the swinging arms rotate under stress, the torsion spring is extruded; and when the acting force disappears, the torsion spring is rapidly reset so as to drive the swinging arms back to the lower stopping point to form a close ring again. When the lock catch is buckled on the buckle ring of the pet collar, because the swinging arms are at the lower stopping point, regardless of the pull degree, the lock catch may not be disengaged from the buckle ring of the pet collar. Even if the elasticity of the torsion spring is reduced and the resetting pulling force is reduced after long-term use, the abutting position of the swinging arms generates a small opening gap and is not closed. As long as the ring diameter of the buckle ring of the pet collar is greater than the opening gap, the abutting position is closed again under the action of the buckle ring of the pet collar so that the buckle ring of the pet collar cannot be disengaged from the lock catch. Through the arrangement of even number of swinging resetting mechanisms, multiple protections are formed, so as to further prevent the buckle ring of the pet collar from being disengaged from the lock catch. In addition, two methods can be used for buckling the buckle ring of the pet collar into the traction hook: the first method is: the swinging arms on both sides are simultaneously pushed to drive one abutting end to rotate to form an opening, so that the buckle ring of the pet collar enters the closed ring. The second method is: the abutting positions of the swinging arms are pushed towards the bottom of the U-shaped hook body directly by the buckle ring of the pet collar, so as to enter the closed ring. It can be seen that the lock catch for pet traction in the present invention has novel appearance, flexible and convenient use and difficult unhooking.

According to the present invention, further, each swinging arm comprises a pushing part, a second connecting part and an abutting part which are connected in sequence; the pushing part is positioned outside the installing part; the second connecting part is penetrated inside the through hole, rotatably connected with the cylindrical pin and fixedly connected with the torsion spring; the abutting parts are positioned inside the installing parts; and two symmetrical abutting parts can be abutted against each other.

The beneficial effects produced by adopting the above technical solution are: the pushing part can be pushed to drive the second connecting part to rotate, so as to drive the abutting part to rotate to open and close the lock catch. On the contrary, the abutting part can be pushed to drive the second connecting part to rotate, so as to drive the pushing part to rotate. The two modes can enable the swinging arms to rotate, and the operation is flexible and convenient.

According to the present invention, further, the pushing parts are in a circular arc shape; one end can be abutted against the outer sides of the installing parts; and the other end extends to the outer sides of the installing parts.

The beneficial effects produced by adopting the above technical solution are: on one hand, it is convenient to exert force, and on the other hand, a limiting effect can be performed to further limit the swinging arms in the position of the lower stopping point.

According to the present invention, further, the abutting parts are of an irregular circular arc structure.

The beneficial effects produced by adopting the above technical solution are: the sufficient closing of the abutting parts is facilitated, and mutual interference can be avoided when the abutting parts rotate.

According to the present invention, further, two groups of swinging resetting mechanisms are arranged; every two swinging resetting mechanisms are symmetrically arranged; and two adjacent groups of swinging resetting mechanisms are arranged in parallel on the same plane along the penetration direction of both ends of the U shape.

The beneficial effects produced by adopting the above technical solution are: even if one torsion spring is aged and has reduced elasticity or other accidents, the phenomenon of unhooking can be avoided and the lock catch can also be light and compact.

According to the present invention, further, the abutting positions of the abutting parts in the two adjacent groups of swinging arms are staggered.

The beneficial effects produced by adopting the above technical solution are: even if a plurality of torsion springs are aged and have reduced elasticity or large external force, the phenomenon of unhooking can also be avoided.

According to the present invention, further, the lock catch further comprises a connecting column and a limiting structure; one end of the connecting column is connected with the bottom end of the first connecting part; the other end penetrates through the pull ring; and the limiting structure is a nut, and is helically connected with the other end of the connecting column.

The beneficial effects produced by adopting the above technical solution are: the traction hook can be connected to the pull ring through the connecting column and can be fixed and limited through the limiting structure to prevent disengagement.

According to the present invention, further, the pull ring comprises a traction ring and a connecting sleeve; the connecting sleeve is integrally connected to the traction ring; and the connecting column penetrates through the connecting sleeve and is detachably connected with the limiting structure.

The beneficial effects produced by adopting the above technical solution are: the connecting column is connected with the pull ring through the connecting sleeve.

Appended aspects and advantages of the present invention will be partially supplied in the following description. Parts will become apparent from the following description, or will be known through the practice of the present invention.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 1:
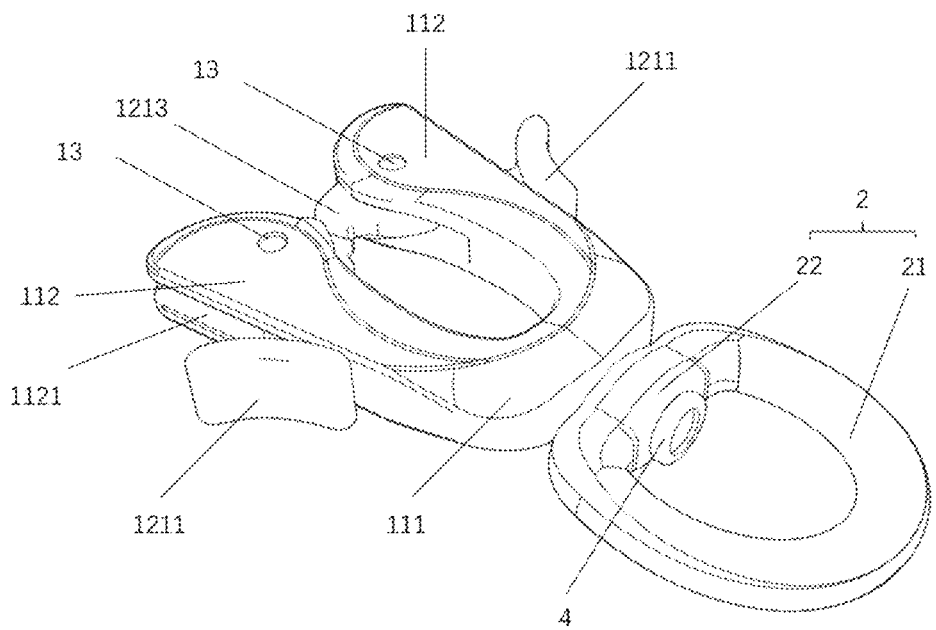
FIG. 1 is a three-dimensional structural schematic diagram of a lock catch for pet traction provided by the present invention.

Reference Signs:
1. traction hook;
11. hook body; 111. first connecting part; 112. installing part; 1121. through hole;
12. swinging resetting mechanism; 121. swinging arm; 1211. pushing part; 1212. second connecting part; 1213. abutting part; 122. torsion spring;
13. cylindrical pin;
2. pull ring; 21. traction ring; 22. connecting sleeve;
3. connecting column;
4. limiting structure.

DETAILED DESCRIPTION

Embodiments of the present invention will be described below in detail.

Examples of the embodiments are shown in drawings, wherein same or similar reference signs refer to same or similar elements or elements having same or similar functions from beginning to end. Embodiments described below by reference to the drawings are exemplary embodiments, and are used for explaining the present invention, and shall not be understood as a limitation to the present invention.

A lock catch for pet traction disclosed by embodiments of the present invention is detailed below with reference to FIGS. 1-6. Embodiments of the present invention disclose the lock catch for pet traction, as shown in FIGS. 1-6, which comprises a traction hook 1 and a pull ring 2 connected with one end of the traction hook 1. The traction hook 1 comprises a hook body 11, an even number of swinging resetting mechanisms 12 and cylindrical pins 13.

The hook body 11 comprises a first connecting part 111 and two installing parts 112; the two installing parts 112 are symmetrically and integrally connected to both ends of the first connecting part 111 and form a U shape; the first connecting part 111 is connected with the pull ring 2; and the two installing parts 112 are provided with through holes 1121 along the relative arrangement directions of the two installing parts.

Every two swinging resetting mechanisms 12 form a group and are symmetrically penetrated in corresponding through holes 1121; the cylindrical pins 13 correspond to the number of the swinging resetting mechanisms 12, and are fixed and inserted on the installing parts 112; each swinging resetting mechanism 12 comprises a swinging arm 121 and a torsion spring 122; the middle part of the swinging arm 121 penetrates through the through hole 1121 and is rotatably connected with the cylindrical pin 13; the torsion spring 122 is fixedly sleeved on the cylindrical pin 13; one end of the torsion spring is abutted against a hole wall of the through hole 1121 close to the top end of the installing part 112, and the other end is connected with the swinging arm 121; through the pretightening force of the torsion spring 122, one end of each group of swinging arms 121 positioned on the outer side of the installing part 112 is positioned at a lower stopping point, and the other end can be mutually abutted against each other; and open ends limited by the two installing parts 112 and the first connecting part 111 are closed.

Figure 2:
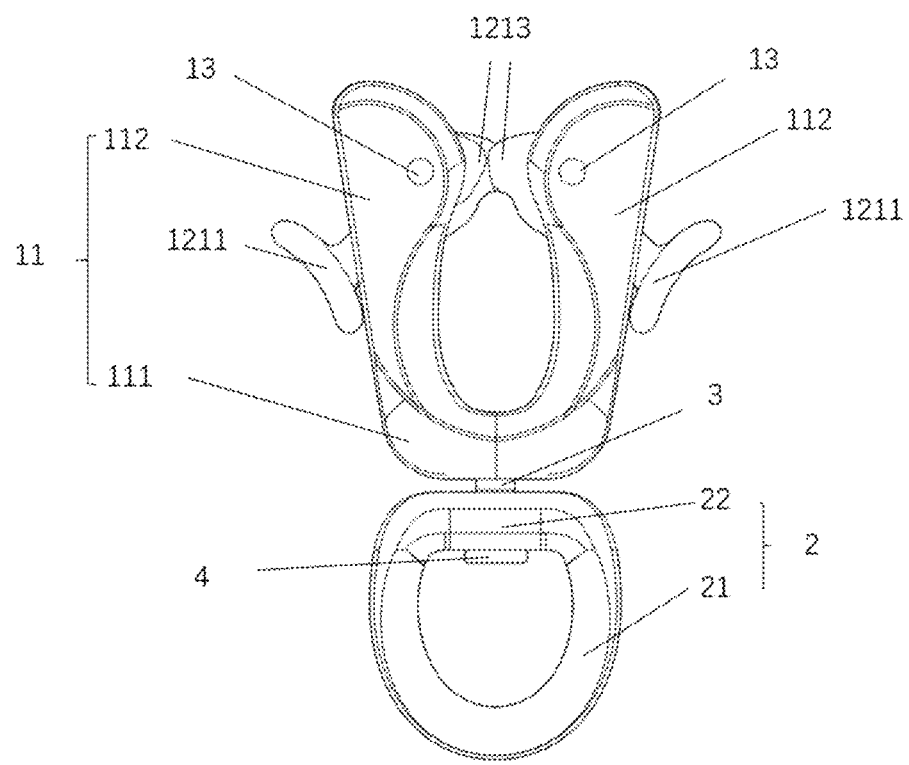
FIG. 2 is a front view of a lock catch for pet traction provided by the present invention.
Figure 3:
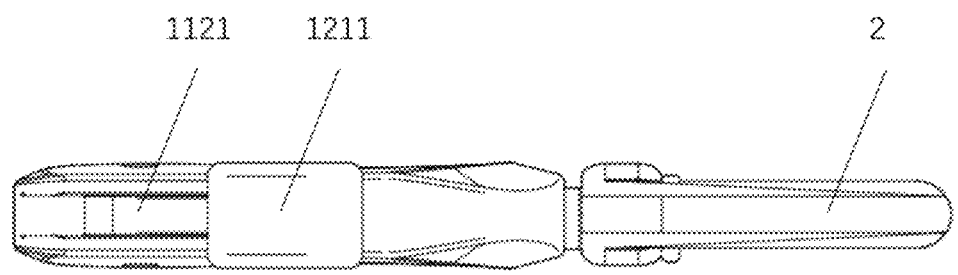
FIG. 3 is a side view of a lock catch for pet traction provided by the present invention.

According to an embodiment of the present invention, by referring to FIGS. 1-2, the lock catch also comprises cylindrical pins 13. The surfaces of the installing parts 112 vertically penetrate through the direction of the through holes 1121 and are symmetrically provided with pin holes; the cylindrical pins 13 are fixed and inserted into the pin holes; and the cylindrical pins 13 are fixedly sleeved with the torsion springs 122 and rotatably sleeved with the swinging arms 121. The swinging arms can swing in the installing parts 112 through the cylindrical pins 13.

Figure 5:
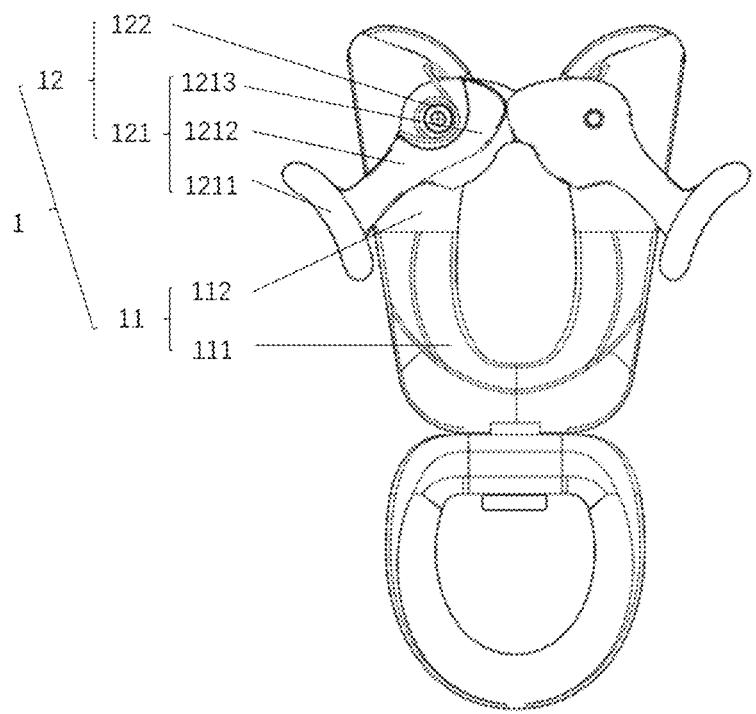
FIG. 5 is a local sectional view of a closing position of a lock catch for pet traction provided by the present invention.
Figure 6:
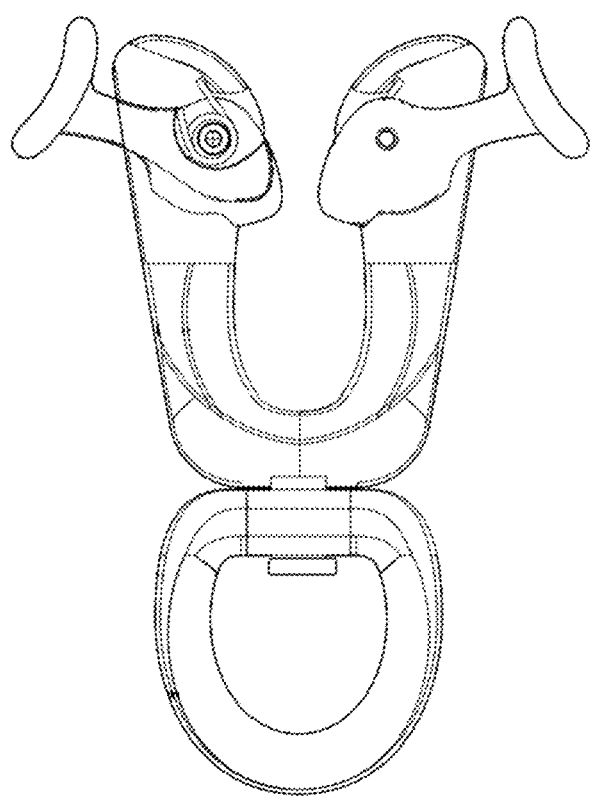
FIG. 6 is a local sectional view of an opening position of a lock catch for pet traction provided by the present invention.

According to an embodiment of the present invention, by referring to FIGS. 5-6, each swinging arm 121 comprises a pushing part 1211, a second connecting part 1212 and an abutting part 1213 which are connected in sequence; the pushing part 1211 is positioned outside the installing part 112; the second connecting part 1212 is penetrated inside the through hole 1121, rotatably connected with the cylindrical pin 13 and fixedly connected with the torsion spring 122; the abutting parts 1213 are positioned inside the installing parts 112; and two symmetrical abutting parts 1213 can be abutted against each other. The pushing part 1211 can be pushed to drive the second connecting part 1212 to rotate, so as to drive the abutting part 1213 to rotate to open and close the lock catch. On the contrary, the abutting part 1213 can be pushed to drive the second connecting part 1212 to rotate, so as to drive the pushing part 1211 to rotate. The two modes can enable the swinging arms to rotate, and the operation is flexible and convenient.

According to an embodiment of the present invention, the pushing parts 1211 are in a circular arc shape; one end can be abutted against the outer sides of the installing parts 112; and the other end extends to the outer sides of the installing parts 112. On one hand, it is convenient to exert force, and on the other hand, a limiting effect can be performed to further limit the swinging arms 121 in the position of the lower stopping point.

According to an embodiment of the present invention, the abutting part 1213 is an irregular circular arc structure, as shown in FIG. 2. The abutting positions are circular arcs, and other positions are smooth structures contracting toward the center. Sufficient closing of the abutting parts 1213 is facilitated, and mutual interference can be avoided when the abutting parts 1213 rotate.

According to an embodiment of the present invention, two groups of swinging resetting mechanisms 12 are arranged; every two swinging resetting mechanisms 12 are symmetrically arranged; and two adjacent groups of swinging resetting mechanisms 12 are arranged in parallel on the same plane along the penetration direction of both ends of the U shape. Even if one torsion spring 122 is aged and has reduced elasticity or other accidents, the phenomenon of unhooking can be avoided and the lock catch can also be light and compact.

Figure 4:
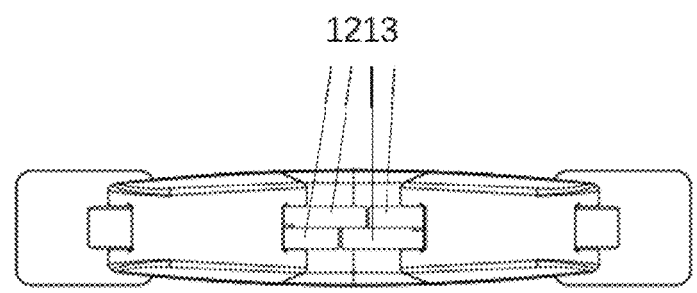
FIG. 4 is a top view of a lock catch for pet traction provided by the present invention.

According to an embodiment of the present invention, the abutting positions of the abutting parts 1213 in the two adjacent groups of swinging arms 121 are staggered, as shown in FIG. 4. After the first group of swinging arms 121 is arranged, abutting closing openings of the abutting parts 1213 of the second group of swinging arms 121 are arranged in the left position or the right position of the abutting closing openings of the first group of swinging arms. In this way, even if a plurality of torsion springs 122 are aged and have reduced elasticity or large external force, when the buckle rings of the pet collar are disengaged from one group of abutting closing openings, the pet collar may not be directly disengaged from the other group of abutting closing openings even though the other group of closing openings is loosened and opened, but may be blocked by the abutting parts 1213 of the other group of swinging arms 121, thereby further avoiding the phenomenon of unhooking.

According to an embodiment of the present invention, the lock catch further comprises a connecting column 3 and a limiting structure 4; one end of the connecting column 3 is connected with the bottom end of the first connecting part 111; the other end penetrates through the pull ring 2; and the limiting structure 4 is a nut, and is helically connected with the other end of the connecting column 3. The traction hook 1 can be connected to the pull ring 2 through the connecting column 3 and can be fixed and limited through the limiting structure 4 to prevent disengagement. For example, one end of the connecting column 3 can be a threaded structure; and the limiting structure 4 can be a nut. After the connecting column 3 penetrates through the pull ring 2, the nut is screwed into the connecting column 3 to prevent the connecting column 3 from being disengaged.

According to an embodiment of the present invention, the pull ring 2 comprises a traction ring 21 and a connecting sleeve 22; the connecting sleeve 22 is integrally connected to the traction ring 21; and the connecting column 3 penetrates through the connecting sleeve 22 and is detachably connected with the limiting structure 4.

The working principle of the lock catch for pet traction in the present invention is:

One end of the pull ring 2 is connected with a pet traction rope, and one end of the traction hook 1 is buckled on the buckle ring of the pet collar. When the pushing parts 1211 of the swinging arms 121 are positioned at the bottom ends of the through holes 1121, the abutting parts 1213 of two swinging arms 121 are abutted and formed a closed ring with the hook body 11, as shown in FIG. 5. When the pushing parts 1211 or the abutting parts 1213 of the swinging arms 121 rotate under stress, the abutting positions generate an opening, so that the lock catch can be buckled on the ring buckle of the pet collar. Meanwhile, when the second connecting parts 1212 of the swinging arms 121 rotate under stress, the torsion spring 122 is extruded, as shown in FIG. 6; and when the acting force disappears, the torsion spring 122 is rapidly reset so as to drive the swinging arms 121 back to the lower stopping point to form a close ring again. When the lock catch is buckled on the buckle ring of the pet collar, because the swinging arms 121 are at the lower stopping point, regardless of the pull degree, the lock catch may not be disengaged from the buckle ring of the pet collar. Even if the elasticity of the torsion spring 122 is reduced and the resetting pulling force is reduced after long-term use, the abutting position of the swinging arms 121 generates a small opening gap and is not closed. As long as the ring diameter of the buckle ring of the pet collar is greater than the opening gap, the abutting position is closed again under the action of the buckle ring of the pet collar so that the buckle ring of the pet collar cannot be disengaged from the lock catch. Through the arrangement of even number of swinging resetting mechanisms 12, multiple protections are formed. Especially, the closing openings of the abutting parts 1213 in the two adjacent groups of swinging arms 121 are staggered, so as to further prevent the buckle ring of the pet collar from being disengaged from the lock catch.

It should be noted in the description of the present invention that terms such as "upper", "lower", "top", "bottom", "inner", "outer", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

In addition, the terms of "first" and "second" are only used for the purpose of description, rather than being understood to indicate or imply relative importance or hint the number of indicated technical features. Thus, the features limited by "first" and "second" can explicitly or impliedly comprise one or more features. In the description of the present invention, the meaning of "a plurality of" is two or more unless otherwise clearly specified.

In the present invention, unless otherwise specifically regulated and defined, terms of "installation", "connecting", "fixation" and the like shall be understood in broad sense, and for example, may refer to fixed connection or detachable connection or integral connection, may refer to mechanical connection or electrical connection, and may refer to direct connection or indirect connection through an intermediate medium. For those ordinary skilled in the art, the specific meanings of the above terms in the present invention may be understood according to concrete conditions.

In the illustration of this description, the illustration of reference terms of "one embodiment", "some embodiments", etc. means that specific features, structures or characteristics illustrated in combination with the embodiment or example are included in at least one embodiment or example of the present invention. In this description, exemplary statements for the above terms do not have to aim at the same embodiment or example. Moreover, the described specific features, structures or characteristics can be combined appropriately in any one or more embodiments or examples. In addition, those skilled in the art can combine and integrate different embodiments or examples illustrated in this description.

Although the embodiments of the present invention have been shown and described above, it will be appreciated that the above embodiments are exemplary and shall not be understood as limitations to the present invention. Those ordinary skilled in the art can make changes, amendments, replacements and variations to the above embodiments within the scope of the present invention.

The invention claimed is:

1. A lock catch for pet traction, comprising a traction hook (1) and a pull ring (2) connected with one end of the traction hook (1), wherein the traction hook (1) comprises a hook body (11), an even number of swinging resetting mechanisms (12) and cylindrical pins (13);

the hook body (11) comprises a first connecting part (111) and two installing parts (112); the two installing parts (112) are symmetrically and integrally connected to both ends of the first connecting part (111) and form a U shape; the first connecting part (111) is connected with the pull ring (2); the two installing parts (112) are provided with through holes (1121) along the relative arrangement directions of the two installing parts;

every two swinging resetting mechanisms (12) form a group and are symmetrically penetrated in the corresponding through holes (1121);

the cylindrical pins (13) correspond to the number of the swinging resetting mechanisms, and are fixed and inserted on the installing parts (112);

each swinging resetting mechanism (12) comprises a swinging arm (121) and a torsion spring (122); the middle part of the swinging arm (121) penetrates through the through hole (1121) and is rotatably connected with the cylindrical pin (13); the torsion spring (122) is fixedly sleeved on the cylindrical pin (13); one end of the torsion spring is abutted against a hole wall of the through hole (1121) close to the top end of the installing part (112), and the other end is connected with the swinging arm (121); through the pretightening force of the torsion spring (122), one end of each group of swinging arms (121) positioned on the outer side of the installing part (112) is positioned at a lower stopping point, and the other end can be mutually abutted against each other; and open ends limited by the two installing parts (112) and the first connecting part (111) are closed.

2. The lock catch for pet traction according to claim 1, wherein each swinging arm (121) comprises a pushing part (1211), a second connecting part (1212) and an abutting part (1213) which are connected in sequence; the pushing part (1211) is positioned outside the installing part (112); the second connecting part (1212) is penetrated inside the through hole (1121), rotatably connected with the cylindrical pin (13) and fixedly connected with the torsion spring (122); the abutting parts (1213) are positioned inside the installing parts (112); and two symmetrical abutting parts (1213) can be abutted against each other.

3. The lock catch for pet traction according to claim 2, wherein the pushing parts (1211) are in a circular arc shape; one end can be abutted against the outer sides of the installing parts (112); and the other end extends to the outer sides of the installing parts (112).

4. The lock catch for pet traction according to claim 2, wherein the abutting parts (1213) are of an irregular circular arc structure.

5. The lock catch for pet traction according to claim 2, wherein two groups of swinging resetting mechanisms (12) are arranged; every two swinging resetting mechanisms (12) are symmetrically arranged; and two adjacent groups of swinging resetting mechanisms (12) are arranged in parallel on the same plane along the penetration direction of both ends of the U shape.

6. The lock catch for pet traction according to claim 5, wherein the abutting positions of the abutting parts (1213) in the two adjacent groups of swinging arms (121) are staggered.

7. The lock catch for pet traction according to claim 2, further comprising a connecting column (3) and a limiting structure (4), wherein one end of the connecting column (3) is connected with the bottom end of the first connecting part (111); the other end penetrates through the pull ring (2); and the limiting structure (4) is a nut, and is helically connected with the other end of the connecting column (3).

8. The lock catch for pet traction according to claim 7, wherein the pull ring (2) comprises a traction ring (21) and a connecting sleeve (22); the connecting sleeve (22) is integrally connected to the traction ring (21); and the connecting column (3) penetrates through the connecting sleeve (22) and is detachably connected with the limiting structure (4).

\* \* \* \* \*